United States Patent
Gillen et al.

(10) Patent No.: US 10,040,325 B2
(45) Date of Patent: Aug. 7, 2018

(54) VALVE ASSEMBLY FOR A TIRE INFLATION SYSTEM

(71) Applicant: DANA HEAVY VEHICLE SYSTEMS GROUP, LLC, Maumee, OH (US)

(72) Inventors: Kurt Gillen, Perrysburg, OH (US); Lloyd G. Racine, Lamoure, ND (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 17 days.

(21) Appl. No.: 14/392,364

(22) PCT Filed: Jul. 30, 2014

(86) PCT No.: PCT/US2014/048823
§ 371 (c)(1),
(2) Date: Jan. 19, 2016

(87) PCT Pub. No.: WO2015/017509
PCT Pub. Date: Feb. 5, 2015

(65) Prior Publication Data
US 2016/0207365 A1 Jul. 21, 2016

Related U.S. Application Data

(60) Provisional application No. 61/860,942, filed on Aug. 1, 2013.

(51) Int. Cl.
*B60C 29/00* (2006.01)
*B60C 23/00* (2006.01)
(Continued)

(52) U.S. Cl.
CPC .......... *B60C 29/005* (2013.01); *B60C 23/003* (2013.01); *F16K 15/141* (2013.01);
(Continued)

(58) Field of Classification Search
None
See application file for complete search history.

(56) References Cited

U.S. PATENT DOCUMENTS 1,196,142 A * 8/1916 Schroeder ............... B60S 5/043
137/224
2,533,965 A * 12/1950 Schmohl ............. F04B 53/1092
137/102
(Continued)

FOREIGN PATENT DOCUMENTS

JP H0679339 A 3/1994

OTHER PUBLICATIONS

"Annular", Merriam-Webster. Printed Dec. 2016.*
(Continued)

*Primary Examiner* — R. K. Arundale
(74) *Attorney, Agent, or Firm* — Marshall & Melhorn, LLC (57) ABSTRACT

An exhaust stem for use with a valve assembly is provided. The exhaust stem is a hollow body which comprises an inner surface, a distal end, and an outer surface. The inner surface forms a portion of a fluid conduit through the exhaust stem. The distal end is shaped to sealingly engage a valve of the valve assembly. The outer surface defines a plurality of turbulence reducing protuberances. The plurality of turbulence reducing protuberances distributes a fluid within a valve housing of the valve assembly to facilitate operation of the valve assembly. The valve assembly decreases an amount of fluid turbulence in a tire inflation system, provides greater flexibility in configuring the tire inflation system, and facilitates accurate control of a pressure within individual tires of a vehicle.

20 Claims, 4 Drawing Sheets

(51) Int. Cl.
*F16K 47/16* (2006.01)
*F16K 15/14* (2006.01)
*F16K 15/20* (2006.01)

(52) U.S. Cl.
CPC ............ *F16K 15/202* (2013.01); *F16K 47/16* (2013.01); *Y10T 137/2544* (2015.04); *Y10T 137/36* (2015.04); *Y10T 137/7778* (2015.04)

(56) References Cited

U.S. PATENT DOCUMENTS

| | | | | |
|---|---|---|---|---|
| 2,567,391 | A * | 9/1951 | Mead | B25D 9/14 137/102 |
| 3,093,153 | A * | 6/1963 | Horowitz | F16K 15/023 137/102 |
| 3,196,890 | A * | 7/1965 | Brandenberg | F16K 15/141 137/102 |
| 3,279,487 | A * | 10/1966 | Elam | A61M 16/208 128/204.19 |
| 3,491,786 | A * | 1/1970 | Bermingham | F16K 15/207 137/102 |
| 4,461,313 | A * | 7/1984 | Beaumont | B60T 15/54 137/102 |
| 4,878,513 | A * | 11/1989 | Ashby | B60T 17/043 137/102 |
| 4,924,926 | A | 5/1990 | Schultz et al. | |
| 5,035,255 | A * | 7/1991 | Geiger | B60C 23/003 137/102 |
| 5,305,777 | A * | 4/1994 | Nakamura | F15B 11/06 137/102 |
| 5,425,572 | A * | 6/1995 | Koelzer | B60T 8/343 137/102 |
| 5,553,647 | A | 9/1996 | Jaksic | |
| 5,904,334 | A | 5/1999 | Grunert et al. | |
| 6,827,096 | B1 * | 12/2004 | Kayukawa | F16K 17/0473 137/102 |
| 6,843,115 | B2 | 1/2005 | Rutherford | |
| 7,089,953 | B2 | 8/2006 | Beau | |
| 7,296,782 | B2 | 11/2007 | Enerson et al. | |
| 7,641,174 | B2 | 1/2010 | Enerson et al. | |
| 2004/0103939 | A1 * | 6/2004 | Beau | B60C 23/003 137/225 |
| 2008/0072972 | A1 * | 3/2008 | Ehrman | B60K 15/03519 137/493.7 |
| 2008/0087859 | A1 | 4/2008 | Enerson et al. | |
| 2012/0241029 | A1 | 9/2012 | Carollo | |
| 2014/0261744 | A1 * | 9/2014 | Sansum | G05D 23/1353 137/15.18 |

OTHER PUBLICATIONS

"Ring", Merriam-Webster. Printed Dec. 2016.*
European Patent Office, International Search Report and Written Opinion of PCT/US2014/048823, dated Oct. 2, 2014, 9 pages, Rijswijk, Netherlands.

* cited by examiner

VALVE ASSEMBLY FOR A TIRE INFLATION SYSTEM

RELATED APPLICATION

The present application claims the benefit of U.S. Provisional Application No. 61/860,942 filed on Aug. 1, 2013, which is incorporated herein in its entirety by reference.

FIELD OF THE INVENTION

The invention relates to tire inflation systems for vehicles and, more particularly, to an exhaust stem valve forming a portion of a tire inflation system.

BACKGROUND OF THE INVENTION

Tire inflation systems for vehicles are well-known and are used to provide a vehicle with versatility for differing terrain types or to reduce maintenance requirements. For example, a pressure of a plurality of tires in fluid communication with the tire inflation system may be lowered to provide additional traction for the vehicle and may be raised to reduce a rolling resistance of the vehicle. Further, the vehicle having the tire inflation system eliminates a need to periodically check a pressure within each tire and eliminates a need to adjust the pressure within each tire when the pressure within each tire requires adjustment as desired.

Modern tire inflations systems are operated using a single source of positive pressure air. Such designs simplify operation and reduce a number of components of the tire inflation system. In order for a single source of positive pressure air to be used with the tire inflation system, the system may include a complex valving system. Valves used in such systems may perform unreliably due to fluid turbulence within conduits in communication with the valve. The turbulence may cause force imbalances within components of the valve, which may prevent proper operation of the valve. As a result of such turbulence, valve design may restrict fluid flow therethrough to facilitate proper operation of the valve.

Typically, a plurality of components of the tire inflation system is configured for use with a particular vehicle. Such systems are typically designed for a given configuration of air supply lines and tire fill lines. A position of the components of the system (such as valves and conduits) may be adjusted to optimize performance. Such designs may require modifications to allow the tire inflation system to be used in multiple configurations and vehicles.

Adjustment of an inflation level of a plurality of tires of a vehicle including the conventional tire inflation system is typically performed by adjusting an inflation level of all of the tires associated with one of the axles of the vehicle. Such systems do not permit adjustment of an inflation level over individual tires of the vehicle. An operator of the vehicle may find individual control over an inflation level of each tire to be particularly advantageous; such as when a tire is damaged or when a load on the vehicle is imbalanced.

It would be advantageous to develop a valve assembly for a tire inflation system that decreases an amount of fluid turbulence in the tire inflation system, provides greater flexibility in configuring the tire inflation system, and facilitates accurate control of a pressure within individual tires of a vehicle.

SUMMARY OF THE INVENTION

Presently provided by the invention, a valve assembly for a tire inflation system that decreases an amount of fluid turbulence in the tire inflation system, provides greater flexibility in configuring the tire inflation system, and facilitates accurate control of a pressure within individual tires of a vehicle, has surprisingly been discovered.

In one embodiment, the present invention is directed to an exhaust stem for use with a valve assembly. The exhaust stem is a hollow body which comprises an inner surface, a distal end, and an outer surface. The inner surface forms a portion of a fluid conduit through the hollow body. The distal end is shaped to sealingly engage a valve of the valve assembly. The outer surface defines a plurality of turbulence reducing protuberances. The plurality of turbulence reducing protuberances distributes a fluid within a valve housing of the valve assembly to facilitate operation of the valve assembly.

In another embodiment, the present invention is directed to an exhaust stem for use with a valve assembly. The exhaust stem comprises a first end portion, a middle portion, and a second end portion. The first end portion has a hollow cylindrical shape. The middle portion has a hollow ring shape, is adjacent the first end portion, and has a diameter greater than the first end portion. The second end portion has a hollow, substantially conical shape and comprises a distal end and an outer surface. The distal end is shaped to sealingly engage a valve of the valve assembly. The outer surface defines a plurality of turbulence reducing protuberances. The plurality of turbulence reducing protuberances distributes a fluid within a valve housing of the valve assembly to facilitate operation of the valve assembly.

In yet another embodiment, the present invention is directed to a valve assembly for use with a tire inflation system. The valve assembly comprises a valve housing, a valve, and an exhaust stem. The valve housing defines a valving cavity. The valve is disposed in the valving cavity of the valve housing. The valve has an annular shape and is formed from a resilient material. The exhaust stem is at least partially disposed in the valving cavity and comprises an inner surface, a distal end, and an outer surface. The inner surface forms a portion of a fluid conduit through the exhaust stem. The distal end is shaped to sealingly engage the valve. The outer surface defines a plurality of turbulence reducing protuberances. The plurality of turbulence reducing protuberances distributes a fluid within the valve housing to facilitate operation of the valve assembly.

Various aspects of this invention will become apparent to those skilled in the art from the following detailed description of the preferred embodiment, when read in light of the accompanying drawings.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
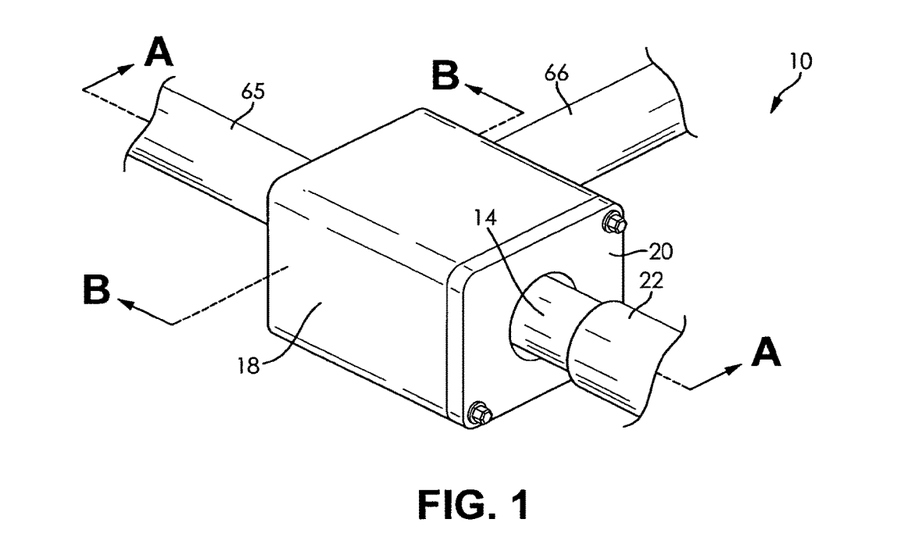
FIG. 1 is a perspective view of a valve assembly for use with a tire inflation system according to an embodiment of the invention.

FIG. 1 illustrates a valve assembly 10 for use with a tire inflation system 12 (partially illustrated in FIG. 8) according to an embodiment of the present invention. The valve assembly 10 comprises an exhaust stem 14, a valve 16 (shown in FIGS. 4, 5, and 6A), a valve housing 18, a retaining clip 20, and an exhaust conduit 22. The exhaust stem 14 is disposed in and sealingly engaged with the valve housing 18. The valve 16 is movably disposed between the valve housing 18 and the exhaust stem 14 when the exhaust stem 14 is disposed in the valve housing 18. The retaining clip 20 is coupled to the valve housing 18 and secures the exhaust stem 14 at least partially within the valve housing 18. The exhaust conduit 22 is coupled to and sealingly engaged with the exhaust stem 14. The valve assembly 10 forms a portion of the tire inflation system 12 for a vehicle (not shown); however, it is understood that the valve assembly 10 may be incorporated into other types of pneumatic systems. The valve 16 of the valve assembly 10 may be placed in a first position and a second position.

Figure 2:
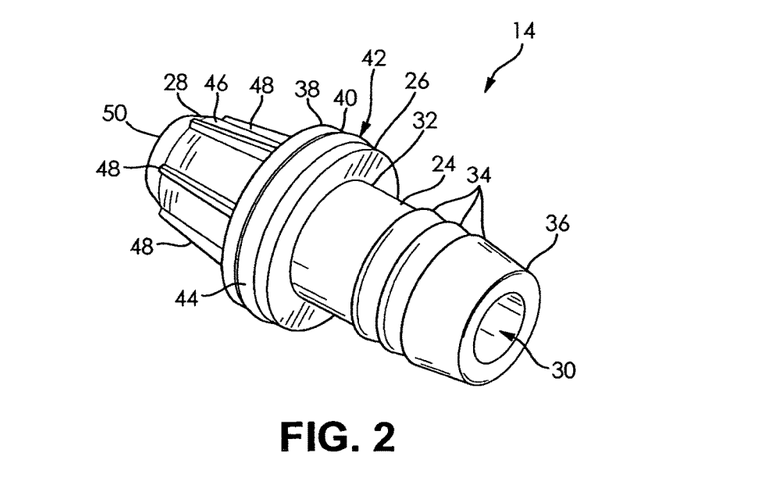
FIG. 2 is a perspective view of an exhaust stem, which is partially shown in FIG. 1.
Figure 3:
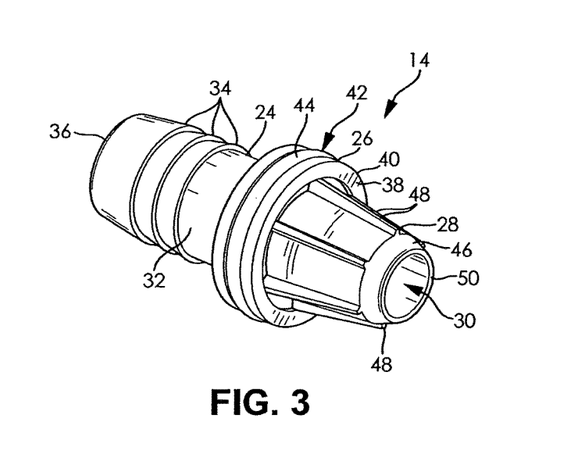
FIG. 3 is another perspective view of the exhaust stem shown in FIG. 2.

FIGS. 2 and 3 illustrate the exhaust stem 14 of the valve assembly 10. The exhaust stem 14 includes a first end portion 24, a middle portion 26, and second end portion 28. The exhaust stem 14 is a hollow body defining a cavity 30 in the exhaust stem 14 from the first end portion 24 to the second end portion 28. The cavity 30 forms a portion of a fluid conduit. The exhaust stem 14 is unitarily formed by molding a plastic; however, it is understood that the exhaust stem 14 may be formed from another rigid material such as a metal using any other process. Alternately, it is understood that the exhaust stem 14 may comprise a plurality of components which are coupled to one another.

The first end portion 24 is a hollow cylindrical shaped portion of the exhaust stem 14. An outer surface 32 of the first end portion 24 defines a plurality of annular barbs 34 adjacent a first distal end 36 of the exhaust stem 14. As shown in FIG. 2, the first end portion 24 comprises three annular barbs 34. Each of the barbs 34 has a triangular cross-section; however, it is understood that each of the barbs 34 may have a cross-section of any shape. The exhaust conduit 22 is disposed over the annular barbs 34 of the first end portion 24 to facilitate sealing engagement between the exhaust stem 14 and the exhaust conduit 22. It is understood that a clamping device (not shown) is typically disposed over the exhaust conduit 22 to apply a radially inward force against the first end portion 24.

Figure 6A:
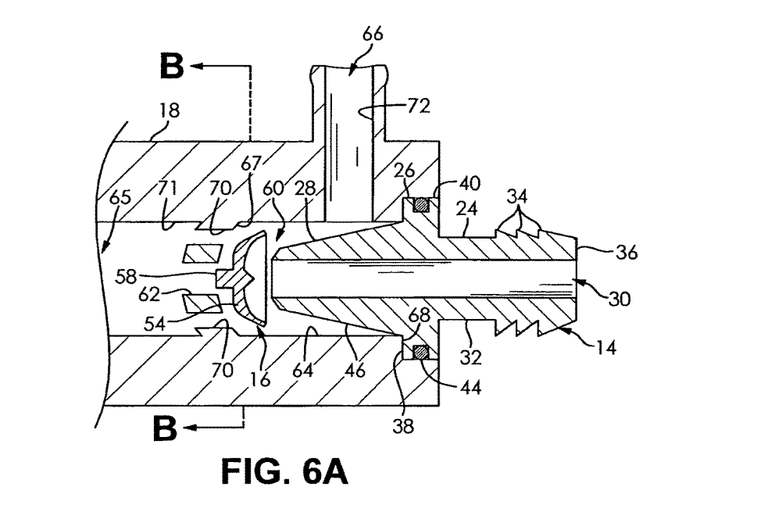
FIG. 6A is a sectional view of the valve assembly shown in FIG. 1, the sectional view taken along line A-A in FIG. 1.

The middle portion 26 is a hollow ring shaped portion of the exhaust stem 14. The middle portion 26 comprises a flanged portion 38 extending towards the second end portion 28. The middle portion 26 has a diameter greater than a diameter of the first end portion 24. An outer surface 40 of the middle portion 26 defines an annular recess 42. As shown in FIGS. 2, 3, and 6A, an O-ring 44 is disposed within the annular recess 42. When the exhaust stem 14 is disposed within the valve housing 18, the O-ring 44 facilitates sealing engagement between the exhaust stem 14 and the valve housing 18.

The second end portion 28 is a hollow, substantially conical shaped portion of the exhaust stem 14. An outer surface 46 of the second end portion 28 defines a plurality of turbulence reducing protuberances 48 extending from adjacent a second distal end 50 of the exhaust stem 14 to within the flanged portion 38 of the middle portion 26. The second end portion 28 comprises six turbulence reducing protuberances 48 equally spaced about the second end portion 28; however, it is understood that the plurality of turbulence reducing protuberances 48 may comprise another number that results in a more evenly distributed application of a fluid around the second end portion 28. The second distal end 50 is a hollow, conical shaped portion of the exhaust stem 14 adapted to be sealingly engaged with the valve 16.

Each of the turbulence reducing protuberances 48 has a trapezoidal cross-section having a height that decreases as each of the turbulence reducing protuberances 48 approaches the second distal end 50; however, it is understood that each of turbulence reducing protuberances 48 may have a cross-section of another shape. Further, it is understood that the valve housing 18 may include turbulence reducing features (not shown) in addition to the turbulence reducing protuberances 48 of the second end portion 28 or that solely one of the valve housing 18 and the second end portion 28 may include the turbulence reducing features and the turbulence reducing protuberances 48, respectively. The second end portion 28 including the turbulence reducing protuberances 48 is disposed within the valve housing 18 when the valve assembly 10 is assembled.

The valve 16 is an annular member formed from a resilient material, preferably an elastomeric material. The valve 16 is most clearly shown in FIGS. 4 and 5. The valve 16 comprises an inner surface 52 and an outer surface 54. When the valve assembly 10 is assembled, the valve 16 is movably disposed between the valve housing 18 and the exhaust stem 14.

Figure 4:
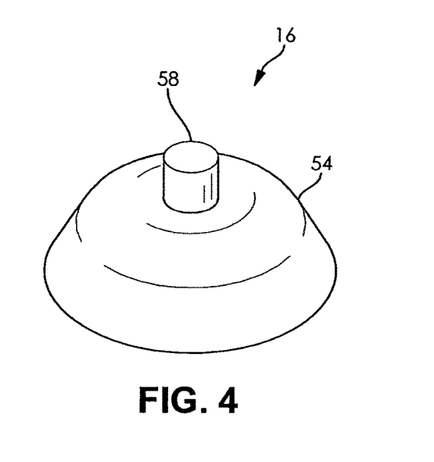
FIG. 4 is a perspective view of a valve used with the valve assembly shown in FIG. 1.
Figure 5:
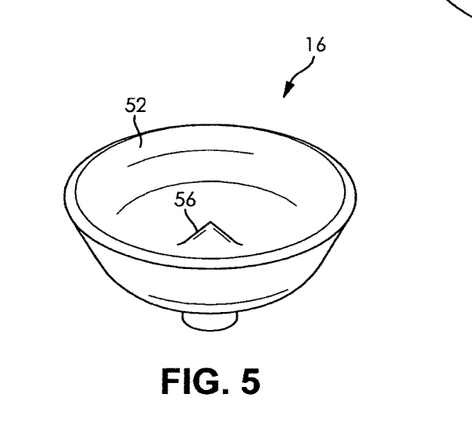
FIG. 5 is another perspective view of the valve shown in FIG. 4.

The inner surface 52 defines a substantially bowl shaped depression having a centrally positioned conical protuberance 56. When the valve 16 is placed in the second position, the inner surface 52 is sealingly engaged with the second distal end 50 of the exhaust stem 14 and the centrally positioned conical protuberance 56 at least partially enters the cavity 30.

The outer surface 54 defines a substantially frustoconical shaped portion of the valve 16 having a centrally positioned cylindrical protuberance 58. When the valve 16 of the valve assembly 10 is placed in the first position, at least a portion of the outer surface 54 is disposed against a valving cavity 60 of the valve housing 18 and the centrally positioned cylindrical protuberance 58 is at least partially disposed within a guide aperture 62. Further, when the valve 16 is placed in the first position, the inner surface 52 is spaced apart from the second distal end 50 of the exhaust stem 14.

Figure 6B:
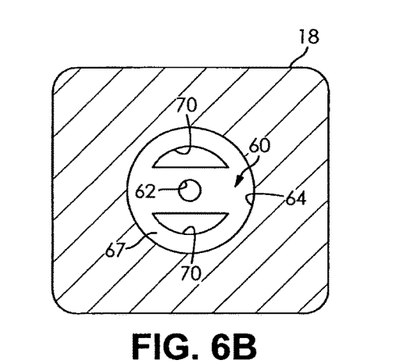
FIG. 6B is a sectional view of the valve assembly shown in FIG. 1, the sectional view taken along line B-B in FIGS. 1 and 6A.

The valve housing 18 is partially illustrated in FIGS. 6A and 6B. The valve housing 18 receives the valve 16 and the exhaust stem 14 when the valve assembly 10 is assembled. As shown in FIG. 1, the retaining clip 20 is coupled to the valve housing 18 and secures the exhaust stem 14 thereto using a pair of threaded fasteners; however, it is understood that the retaining clip 20 may be coupled to the valve housing 18 in any conventional manner. The valve housing 18 is formed from a metal and comprises at least the valving cavity 60 defined by a first surface 64 of the valve housing 18, a supply conduit 65, and an outlet conduit 66, it is understood that the valve housing 18 may be formed from any rigid material and may comprise additional features.

The valving cavity 60 defined by the first inner surface 64 is a stepped cylindrical cavity having a substantially hemisperically shaped end 67. The valving cavity 60 is illustrated in FIGS. 6A and 6B and a step 68 of the valving cavity 60 corresponds to a shape of the middle portion 26 of the exhaust stem 14. When the exhaust stem 14 is disposed in the valving cavity 60, the O-ring 44 facilitates sealing engagement between the annular recess 42 and the first inner surface 64. The first inner surface 64 defines a pair of supply ports 70 and the guide aperture 62.

As illustrated in FIG. 6A, the supply conduit 65 is a fluid conduit at least partially defined by a second inner surface 71 of the valve housing 18; however, it is understood that the supply conduit 65 may be formed separate from the valve housing 18 and coupled thereto in any conventional manner. The supply conduit 65 is in fluid communication with the valving cavity 60 through the supply ports 70 and the guide aperture 62 when the valve 16 is placed in both the first position and the second position.

As illustrated in FIG. 6A, the outlet conduit 66 is a fluid conduit at least partially defined by a third inner surface 72 of the valve housing 18; however, it is understood that the outlet conduit 66 may be formed separate from the valve housing 18 and coupled thereto in any conventional manner. The outlet conduit 66 facilitates fluid communication between the valving cavity 60 and a tire valve 73 (schematically illustrated in FIG. 8). The outlet conduit 66 is in direct fluid communication with the valving cavity 60 when the valve 16 is placed in both the first position and the second position. The outlet conduit 66 is in fluid communication with the cavity 30 of the exhaust stem 14 when the valve 16 is placed in the first position. The outlet conduit 66 is oriented in a substantially transverse manner to an axis of the valving cavity 60; however, it is understood that the outlet conduit 66 may be oriented in any manner that facilitates fluid communication between the outlet conduit 66 and the valving cavity 60.

The pair of supply ports 70 defined by the first inner surface 64 are perforations through the valving cavity 60 to facilitate fluid communication between the valving cavity 60 and the supply conduit 65. It is understood that the valve housing 18 may be configured in any conventional manner to facilitate fluid communication between the valving cavity 60 and the supply conduit 65. The first inner surface 64 defines two supply ports 70 oriented opposite one another about the guide aperture 62. When the valve 16 is placed in the first position, a pressure within the supply conduit 65 may be applied to the outer surface 54 of the valve 16 through the supply ports 70.

The guide aperture 62 is defined by the first inner surface 64 is a circular perforation centrally formed through the substantially hemisperically shaped end 67 of the valving cavity 60; however, it is understood that the guide aperture 62 may have other shapes or may be a recess formed in the valving cavity 60. When the valve 16 is placed in both the first position and the second position, the centrally positioned cylindrical protuberance 58 is disposed in the guide aperture 62 to facilitate orienting the valve 16 within the valving cavity 60.

Figure 7:
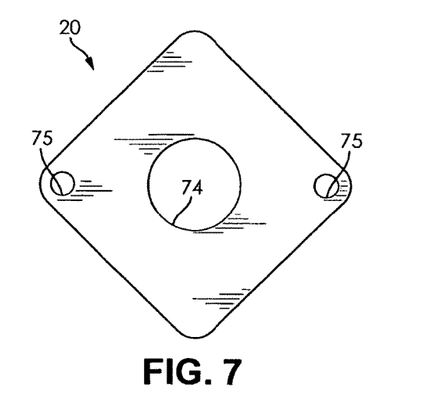
FIG. 7 is a front elevation view of a retaining clip shown in FIG. 1.

The retaining clip 20 is a member formed from a sheet metal; however, it is understood that the retaining clip 20 may be formed from any rigid material or that the valve housing 18 may be configured to secure the exhaust stem 14 thereto without the use of the retaining clip 20. The retaining clip 20 is illustrated in FIG. 7 and defines a central perforation 74 and a pair of fastening perforations 75. A diameter of the central perforation 74 is less than a diameter of the middle portion 26 but greater than a diameter of the first end portion 24 of the exhaust stem 14, allowing the retaining clip 20 to secure the exhaust stem 14 to the valve housing 18 using the pair of threaded fasteners disposed through the fastening perforations 75 and threadingly received by apertures (not shown) formed in the valve housing 18.

The exhaust conduit 22 is coupled to and sealingly engaged with the exhaust stem 14 using the clamping device (not shown), which may be disposed over the exhaust conduit 22 to apply a radially inward force against the annular barbs 34 of the first end portion 24. The exhaust conduit 22 may be a rigid or a flexible conduit. It is understood that the exhaust conduit 22 is an optional component of the valve assembly 10, and that the cavity 30 of the exhaust stem 14 may be in direct fluid communication with an ambient environment of the tire inflation system 12.

In use, the valve assembly 10 facilitates the tire inflation system 12 in performing a measuring procedure, an inflate cycle, and a deflate cycle. The valve assembly 10 decreases an amount of fluid turbulence in the tire inflation system 12, provides greater flexibility in configuring the tire inflation system 12, and facilitates accurate control of a pressure within a tire 76 (schematically illustrated in FIG. 8) of the vehicle incorporating the tire inflation system 12.

Figure 8:
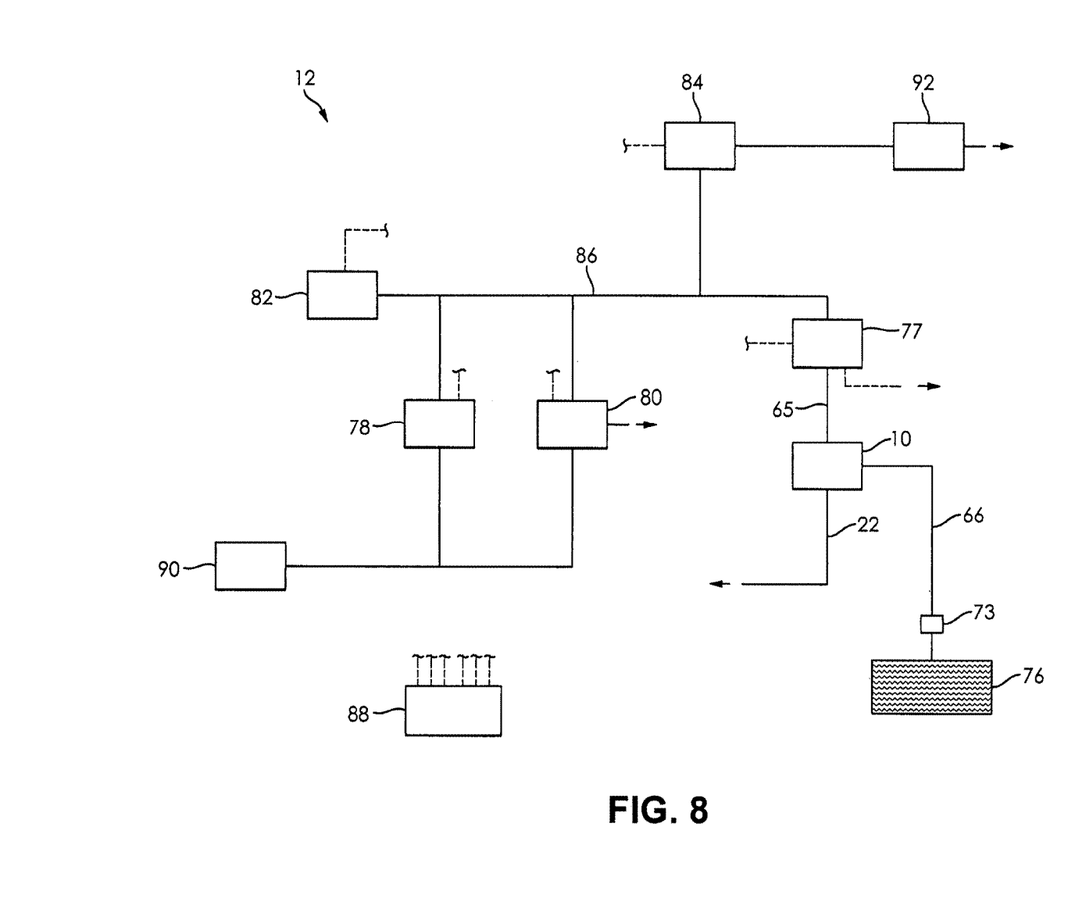
FIG. 8 is a partial schematic illustration of a tire inflation system including the valve assembly shown in FIG. 1.

FIG. 8 schematically illustrates the valve assembly 10 in fluid communication with a channel valve 77, the tire 76, and the ambient environment of the tire inflation system 12. The valve assembly 10 is in fluid communication with the channel valve 77 through the supply conduit 65. The valve assembly 10 is in fluid communication with the tire 76 through the outlet conduit 66 and the tire valve 73. The valve assembly 10 is in fluid communication with the ambient environment of the tire inflation system 12 through the exhaust conduit 22. The channel valve 77 is a solenoid operated valve; however, it is understood that the channel valve 77 may be another type of valve.

As shown in FIG. 8, the channel valve 77 is in fluid communication with a supply valve 78, a control valve 80, a pressure transducer 82, and a deflate valve 84 via a control line 86. A controller 88 in communication with the channel valve 77, the supply valve 78, the control valve 80, the pressure transducer 82 and the deflate valve 84 operates the tire inflation system 12 in response to a set of predetermined instructions or in response to an instruction from an operator of the vehicle incorporating the tire inflation system 12. It is understood that the schematic illustrated in FIG. 8 is exemplary and that the tire inflation system 12 may include a plurality of channel valves 77, each in fluid communication with respective valve assemblies 10 and tires 76. When placed in an energized position by the controller 88, the channel valve 77 facilitates fluid communication between the valve assembly 10 and the control line 86. When the channel valve 77 is placed in a de-energized state, the channel valve 77 is in a closed position, which requires no action by the controller 88; however, it is understood that the channel valve 77 may be another type of valve controlled in a different manner.

The supply valve 78 is a solenoid operated valve; however, it is understood that the supply valve 78 may be another type of valve. The supply valve 78 is in fluid communication with an air source 90 and the control line 86. When placed in an energized position by the controller 88, the supply valve 78 facilitates fluid communication between the air source 90 and the control line 86.

The control valve 80 is a solenoid operated valve; however, it is understood that the control valve 80 may be another type of valve. The control valve 80 is in fluid communication with the air source 90, the control line 86, and the ambient environment of the tire inflation system 12. When placed in an energized position by the controller 88, the control valve 80 facilitates fluid communication between the air source 90 and the control line 86. When placed in a de-energized position by the controller 88, the control valve 80 facilitates fluid communication between the control line 86 and the ambient environment of the tire inflation system 12.

The pressure transducer 82 is a sensor capable of monitoring a fluid pressure within the control line 86. The pressure transducer 82 is also configured to communicate a signal relaying information about the fluid pressure within the control line 86 to the controller 88. The pressure transducer 82 is a conventional pressure transducer and is well known in the art.

The deflate valve 84 is a solenoid operated valve; however, it is understood that the deflate valve 84 may be another type of valve. The deflate valve 84 is in fluid communication with the control line 86 and a pressure relief valve 92. When placed in an energized position by the controller 88, the deflate valve 84 facilitates fluid communication between the control line 86 and the pressure relief valve 92.

The pressure relief valve 92 is a relief valve in communication with the deflate valve 84 and the ambient environment of the tire inflation system 12. The pressure relief valve 92 is configured to be placed in an open position when a pressure in a conduit between the deflate valve 84 and the pressure relief valve 92 is greater than a fixed, predetermined value. When placed in the open position, the pressure relief valve 92 facilitates fluid communication between the control line 86 and the ambient environment of the tire inflation system 12 when the deflate valve 84 is placed in the energized position.

The valve assembly 10 facilitates the tire inflation system 12 in performing the measuring procedure. The measuring procedure is performed through a multi-step process. The measuring procedure begins with the controller 88 placing the supply valve 78 and the control valve 80 in the energized position, while the channel valve 77 and the deflate valve 84 remain in the de-energized state. With the supply valve 78 and the control valve 80 in the energized position, the pressure within the control line 86 substantially equalizes with the air source 90 and the controller 88 records the pressure within the control line 86 as measured by the pressure transducer 82. Information collected by the controller 88 regarding the pressure within the control line 86 is used by the controller 88 to determine a condition of the air source 90, and may be used in determining whether the inflate cycle or the deflate cycle can be performed by the tire inflation system 12.

Next, the controller 88 places the channel valve 77 in the energized position, and pressure from the air source 90 is applied to the supply conduit 65. The pressure increase in the supply conduit 65 causes the valve 16 to sealingly engage the exhaust stem 14, militating against fluid communication from occurring between the supply conduit 65 and the exhaust conduit 22 through the cavity 30. As the valving cavity 60 is in fluid communication with the outlet conduit 66, the supply conduit 65 is in fluid communication with the outlet conduit 66 when the valve 16 becomes sealingly engaged with the exhaust stem 14. The pressure of the air source 90 is then applied to the tire valve 73, which opens in response to the pressure of the air source 90. The above described sequence of events occurs in a relatively quick manner once the channel valve 77 is placed in the energized position. Following the opening of the tire valve 73, the controller de-energizes the supply valve 78, and the pressure within the control line 86 substantially equalizes with the tire 76 and the controller 88 records the pressure within the tire 76 as measured by the pressure transducer 82.

The valve assembly 10 facilitates the tire inflation system 12 in performing the inflate cycle. The measuring procedure is performed immediately to the controller 88 initiating the inflate cycle; however, it is understood that the inflate cycle may be performed independently of the measuring procedure. The inflate cycle is performed through a multi-step process. The inflate cycle begins with the controller 88 placing the supply valve 78 and the control valve 80 in the energized position, while the channel valve 77 and the deflate valve 84 remain in the de-energized position. With the supply valve 78 and the control vale 80 in the energized position, the pressure within the control line 86 substantially equalizes with the air source 90.

Next, the controller 88 places the channel valve 77 in the energized position, and pressure from the air source 90 is applied to the supply conduit 65. The pressure increase in the supply conduit 65 causes the valve 16 to sealingly engage the exhaust stem 14, militating against fluid communication from occurring between the supply conduit 65 and the exhaust conduit 22 through the cavity 30. As the valving cavity 60 is in fluid communication with the outlet conduit 66, the supply conduit 65 is in fluid communication with the outlet conduit 66 when the valve 16 becomes sealingly engaged with the exhaust stem 14. The pressure of the air source 90 is then applied to the tire valve 73, which opens in response to the pressure of the air source 90. The above described sequence of events occurs in a relatively quick manner once the channel valve 77 is placed in the energized position. Following the opening of the tire valve 73, the controller de-energizes the supply valve 78 after a predetermined amount of time. Following the de-energization of the supply valve 78 by the controller 88, the measuring procedure may be performed again by the controller 88 to ensure a desired pressure within the tire 76 is obtained.

The valve assembly 10 facilitates the tire inflation system 12 in performing the deflate cycle. The measuring procedure is performed immediately to the controller 88 initiating the deflate cycle; however, it is understood that the deflate cycle may be performed independently of the measuring procedure. The deflate cycle is performed through a multi-step process. The deflate cycle begins with the controller 88 placing the channel valve 77, the control valve 80, and the deflate valve 84 in the energized position, while the supply valve 78 remains in the de-energized state. It is understood that the channel valve 77 and the tire valve 73 may be opened during the measuring procedure and may remain open as the deflate cycle begins. Alternately, it is understood that the channel valve 77 may be opened by the controller 88 to facilitate opening the tire valve 73. With the channel valve 77 and the deflate valve 84 in the energized position, the pressure relief valve 92 is in fluid communication with the tire 76 through the control line 86.

Next, as the pressure relief valve 92 is in fluid communication with the control line 86, the pressure relief valve 92 opens and a pressure within the control line 86 is lowered to the fixed, predetermined value of the pressure relief valve 92. When the pressure within the control line 86 is lowered to the fixed predetermined value by the pressure relief valve 92, the valve 16 unseats from the exhaust stem 14 to facilitate fluid communication between the tire 76 and exhaust conduit 22. Facilitating fluid communication between the tire 76 and the exhaust conduit 22 releases pressure from the tire 76. The valve 16 unseats from the exhaust stem 14 when a pressure applied to the valve 16 in a direction away from the exhaust stem 14 (towards the supply ports 70) is greater than a pressure applied to the valve 16 in a direction towards the exhaust stem 14 (towards the second distal end 50 of the exhaust stem). The pressure applied to the valve 16 in a direction away from the exhaust stem 14 is caused by two forces: a decrease in pressure within the supply conduit 65 (which is applied to the outer surface 54 of the valve) caused by fluid communication between the control line 86 and the pressure relief valve 92 and a force applied to the inner surface 52 of the valve 16 by a fluid entering the valving cavity 60 from the outlet conduit 66 during the deflate cycle. After a predetermined amount of time, the controller 88 may end the deflate cycle by de-energizing the deflate valve 84. The predetermined amount of time may be based on at least the pressure within the control line 86 and the pressure within the tire 76 prior to performing the deflate cycle. Following the de-energization of the deflate valve 84 by the controller 88, the measuring procedure may be performed again by the controller 88 to ensure a desired pressure within the tire 76 is obtained.

During the deflate cycle, the turbulence reducing protuberances 48 of the exhaust stem 14 facilitate a more evenly distributed application of the fluid entering the valving cavity 60 from the outlet conduit 66 against the inner surface 52 of the valve 16. The more evenly distributed application of the fluid against the inner surface 52 of the valve 16 results in a more consistent unseating of the valve 16 from the exhaust stem 14, allows forces applied to the valve 16 during the deflate cycle to be more easily balanced, allows a greater flow rate of fluid through the valving cavity 60, provides greater flexibility in configuring an orientation of the outlet conduit 66 with respect to the exhaust stem 14 and the valving cavity 60, and facilitates a more accurate control of a pressure within the tire 76 by the controller 88.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An exhaust stem for use with a valve assembly, the exhaust stem comprising:
   a hollow body comprising:
      an inner surface forming a portion of a fluid conduit through the hollow body,
      a distal end shaped to sealingly engage a valve of the valve assembly, and
      an outer surface defining a plurality of circumferentially spaced turbulence reducing protuberances, wherein the plurality of turbulence reducing protuberances distribute a fluid within a valve housing of the valve assembly to reduce turbulent flow within the valve housing and facilitate operation of the valve assembly.

2. The exhaust stem of claim 1, wherein the plurality of turbulence reducing protuberances extend from adjacent the distal end to a middle portion of the exhaust stem.

3. The exhaust stem of claim 1, wherein the plurality of turbulence reducing protuberances are equally spaced about the outer surface of the exhaust stem.

4. The exhaust stem of claim 1, wherein each of the plurality of turbulence reducing protuberances has a trapezoidal cross-section.

5. The exhaust stem of claim 4, wherein the trapezoidal cross-section of each of the plurality of turbulence reducing protuberances decreases in height as each of the turbulence reducing protuberances approaches the distal end.

6. The exhaust stem of claim 1, wherein the hollow body further comprises a middle portion having a hollow ring shape and a first end portion having a hollow cylindrical shape, wherein an outer diameter of the middle portion is greater than an outer diameter of the first end portion.

7. The exhaust stem of claim 6, wherein an outer surface of the middle portion defines an annular recess in the middle portion.

8. The exhaust stem of claim 6, wherein the middle portion and the first end portion form a portion of the fluid conduit through the hollow body.

9. The exhaust stem of claim 6, wherein the hollow body further comprises a second end portion having a hollow, substantially conical shape, and the outer surface and the plurality of turbulence reducing protuberances form a portion of the second end portion.

10. The exhaust stem of claim 9, wherein the middle portion further comprises a flanged portion extending towards the second end portion.

11. The exhaust stem of claim 10, wherein the plurality of turbulence reducing protuberances extend to within the flanged portion.

12. An exhaust stem for use with a valve assembly, the exhaust stem comprising:
   a first end portion having a hollow cylindrical shape;
   a middle portion having a hollow ring shape comprising an outer diameter greater than an outer diameter of the first end portion, the middle portion adjacent the first end portion and having a diameter greater than the first end portion; and
   a second end portion having a hollow, substantially conical shape, the second end portion comprising:
      a distal end shaped to sealingly engage a valve of the valve assembly, and
      an outer surface defining a plurality of turbulence reducing protuberances,
      wherein the plurality of turbulence reducing protuberances distribute a fluid within a valve housing of the valve assembly to reduce turbulent flow within the valve housing and facilitate operation of the valve assembly.

13. The exhaust stem of claim 12, wherein the plurality of turbulence reducing protuberances extend from adjacent the distal end to the middle portion of the exhaust stem.

14. The exhaust stem of claim 12, wherein the plurality of turbulence reducing protuberances are equally spaced about the outer surface of the exhaust stem.

15. The exhaust stem of claim 12, wherein each of the plurality of turbulence reducing protuberances has a trapezoidal cross-section.

16. The exhaust stem of claim 15, wherein the trapezoidal cross-section of each of the plurality of turbulence reducing protuberances decreases in height as each of the turbulence reducing protuberances approaches the distal end.

17. The exhaust stem of claim 12, wherein an outer surface of the middle portion defines an annular recess in the middle portion.

18. The exhaust stem of claim 12, wherein the middle portion further comprises a flanged portion extending towards the second end portion.

19. The exhaust stem of claim 18, wherein the plurality of turbulence reducing protuberances extend to within the flanged portion.

20. A valve assembly for use with a tire inflation system, the valve assembly comprising:
    a valve housing defining a valving cavity;
    a valve disposed in the valving cavity of the valve housing, the valve having an annular shape and formed from a resilient material; and
    an exhaust stem at least partially disposed in the valving cavity and fixedly coupled with the valve housing, the exhaust stem comprising:
        an inner surface forming a portion of a fluid conduit through the exhaust stem,
        a distal end shaped to sealingly engage the valve, and
        an outer surface defining a plurality of turbulence reducing protuberances, wherein
        the plurality of turbulence reducing protuberances distribute a fluid within the valve housing to reduce turbulent flow within the valve housing and facilitate operation of the valve assembly.

\* \* \* \* \*